United States Patent Office 3,227,792
Patented Jan. 4, 1966

3,227,792
SOLUTION SPINNING OF POLYHEXAMETHYLENE
TEREPHTHALAMIDE
Arnold J. Rosenthal, Whippany, and Cipriano Cipriani, Morristown, N.J., assignors to Celanese Corporation of America, New York, N.Y., a corporation of Delaware
No Drawing. Filed June 7, 1960, Ser. No. 34,364
11 Claims. (Cl. 264—203)

This invention relates to an improved process for the formation of shaped articles such as filaments of condensation polymers.

There exists a wide variety of synthetic condensation polymers which are suitable for the manufacture of shaped articles, e.g. filaments and fibers for the manufacture of textiles, and films. Many of these polymers have repeating —CONH— groups as an integral part of the polymer chain. These polymers include the polyamides proper e.g., the nylons wherein repeating —NHCO— groups are attached to carbons on either side, the polyurethanes which contain repeating —NHCOO— groups and the polyureas which contain repeating —NHCONH— groups. The usual method of forming these polymers into shaped articles such as filaments and films is to extrude the melted polymer through suitably shaped openings, e.g. the orifices of a spinnerette in the case of the melt spinning of filaments or a slot in the case of film formation.

While melt extrusion techniques are often suitable for many of the aforementioned polymers it may be desired in some instances to obtain shaped polymer articles without melting the polymer. For example, it may be desired to avoid the degradation that often takes place when some polymers are heated to a degree sufficient to melt them. In other cases it may be desired in producing shaped articles of polymers to use the facilities of an existing plant which are more designed for wet or dry spinning than for melt spinning.

In addition to the above, there exist polymers within the class set out to which melt extrusion techniques cannot easily be applied at all. These polymers may be characterized as "difficulty meltable" polymers. For example, in the case of high melting polymers e.g. polyamides melting above 275° C. and polyurethanes and polyureas melting above 179° C., more usually above 210° C., the polymer often begins to degrade seriously at a temperature very close to the melting point and/or the polymer further polymerizes to a useless infusible mass. However, because of the desirable properties of many of these polymers, e.g., a combination of good mechanical properties such as tenacity and elongation, and a high degree of dye receptivity, water insensitivity and glaze resistance not often found in the more common polymers which can be melt spun, any method which can be used to form them into useful shaped articles such as filaments and films is much to be desired.

Many polymers containing —CONH— groups can be formed into shaped articles such as filaments by dissolving the polymer in a solvent such as formic acid and using wet- or dry-spinning techniques. However, it is often the polymers which are most soluble in solvents such as formic acid that are most easily melt spun without serious disadvantage. Thus commercial polymers such as polyhexamethylene adipamide (nylon 66) and polycaprolactam (nylon 6), which are fairly soluble in formic acid, are almost always formed into filaments and films by means of melt extrusion and casting techniques. On the other hand, polymers which cannot be easily melt spun, e.g. the "difficulty meltable" polymers mentioned above, are often not sufficiently soluble in common solvents such as formic acid for the use of wet- or dry-spinning techniques.

It is an object of this invention to provide an improved method of forming shaped articles of condensation polymers containing —CONH— groups in the polymer chain. It is a further object of this invention to provide a method of forming shaped articles, e.g. filaments, from difficulty meltable polymers of this class.

In accordance with one aspect of the invention, a condensation polymer containing —CONH— groups in the polymer chain and soluble in formic acid containing 2% by weight of water to an extent of less than 5%, generally less than 1% by weight of the solvent at 25° C., is dissolved in a solvent comprising formic acid and a minor amount of sulfuric acid or hydrogen chloride to form a solution which may be extruded through a suitably shaped opening, e.g. the orifices of a spinnerette to form filaments or a slot-shaped opening to form films. The solvent systems of this invention thus make it possible to prepare solutions suitable for spinning of polymers which are not readily soluble in common solvents such as formic acid. In addition it is possible to obtain solutions of polymers in these solvent systems which are stable to storage, e.g. which do not gel, and in which the polymer shows little, if any, decrease in inherent viscosity on storage of the solution.

The polymer solutions in the formic acid-sulfuric acid solvent system may be prepared in any conventional manner, e.g. by physically mixing the two acids in the desired proportions and agitating the resulting mixture with finely divided polymer. Another suitable method, particularly useful in the case of the formic acid-hydrogen chloride systems, is to first prepare a slurry of the finely-divided, solid polymer in the formic acid. The co-solvent, i.e. gaseous hydrogen chloride or sulfuric acid is then introduced into the agitated slurry until the polymer particles are no longer visible. Similarly, solutions of the polymer in the formic acid-sulfuric acid system may be prepared by preparing a slurry of the polymer in formic acid containing an amount of water equivalent to the amount of sulfuric acid desired. An amount of gaseous sulfur trioxide sufficient to react with the water to form sulfuric acid is then bubbled in to obtain the desired polymer solution. The solution, however prepared, is then extruded through a suitably shaped opening, e.g., the orifices of a spinnerette or a slot-shaped opening, into a mass of coagulating liquid i.e. a spin bath, wherein the compounds of the solvent are taken up by the coagulating liquid or into an evaporative atmosphere where at least part of the solvent is vaporized, to obtain a solid polymer having the desired shape.

The process of this invention may be applied to various polymers which, because of the monomers and/or polymerization technique used, have at most a limited solubility in formic acid as defined above. These include, for example, fiber and film forming linear polyamides having repeating structural units of the formula

which result from the condensation of a dicarboxylic acid or one of its ester-forming derivatives e.g., a salt, acyl halide or ester of such an acid with a diamine, polyamides which have repeating structural units of the formula —NH—Y—CO— which result from the autocondensation of aminocarboxylic acids, fiber and film forming polyurethanes having repeating structural units of the formula —NH—Y—NH—CO—O—Y'—CO O—, resulting, for example from the condensation of a diisocyanate and a dihydric alcohol or phenol or from a diamine and a bis(chloroformate) of a dihydric alcohol or phenol, and fiber and film-forming polyureas having repeating structural units of the formula

resulting, for example, from the condensation of a diisocyanate and a diamine, a diamine and a diurethane or a diamine and phosgene, wherein the Y's are divalent organic radicals such as alkylene containing 1 to 10 carbon atoms e.g., ethylene, tetramethylene or hexamethylene, arylene such as para- and meta- phenylene, para xylylene and para-diethylene benzene, cycloalkylene such as 1,4-cyclohexylene, and divalent valent heterocyclic radicals such as those derived from piperazine and alkyl substituted piperazines e.g. the dimethyl- and diethyl piperazines, wherein the open bonds are attached to nitrogen atoms.

An important group of polymers within the above class are many of the difficultly meltable polymers mentioned above, i.e., those prepared from monomers and/or using polymerization techniques such that a polyamide melting above 275° C. or a polyurethane or polyurea melting above 179° C. preferably above 210° C. is obtained. These include, for example, many polymers having repeating structural units of the above formulae, in which at least one repeating group is or contains a para- or meta-phenylene or 1,4-cyclohexylene radical. It has been found that whereas these relatively high melting polymers cannot easily be shaped using melt extrusion techniques because of their tendency when heated to degrade or decompose or to further polymerize to a useless, infusible mass, they can be shaped by dissolving them in the formic acid-sulfuric acid or formic acid-hydrogen chloride solvent systems of this invention and extruding into a coagulating liquid by means of wet spining techniques or into an evaporative atmosphere using dry spinning techniques.

An important group of polyamides which may be treated in accordance with this invention are the polyterephthalamides, i.e., condensation products of a diamine and terephthalic acid or an ester-forming derivative of terephthalic acid, e.g., terephthaloyl chloride or a dialkyl terephthalate. Some specific polymers within this latter group are polyalkylene terephthalamides wherein the alkylene groups contain 1 to 10 carbon atoms, e.g. polyhexamethylene terephthalamide, polytetramethylene terephthalamide, polyethylene terephthalamide and polypiperazylene terephthalamide.

Some specific high melting autocondensation products of an aminocarboxylic acid or a lactam or or other derivative of such an acid are polymers melting above 275° C. of the following monomers: 1-carboxymethyl-4-aminocyclohexane or its lactam, 1-carboxy-4-amino-cyclohexane or its lactam, and 1-carboxy-3-aminocyclopentane or its lactam.

Some specific polyurethanes melting above 210° C. which may be dissolved in accordance with this invention, are for example, the condensation product of piperazine with the bis(chloroformate) of bis(p-hydroxyphenyl) propane-2,2, the condensation product of piperazine with the bis(chloroformate) of cis- or trans-1,4-cyclohexylene glycol, the condensation product of piperazine with the bis(chloroformate) of hydroquinone and the condensation product of tetramethylene diamine with the bis-(chloroformate) of butanediol-1,4.

The solutions formed in accordance with this invention may contain, for example, 1 to 30, preferably 5 to 20% by weight of polymer. In the case of the formic acid-hydrogen chloride systems, sufficient hydrogen chloride is metered into the slurry of polymer in formic acid to dissolve the polymer completely. In many cases, the quantity of sulfuric acid or hydrogen chloride used is one mol per mol of —CONH— groups in the polymer. The quantity of hydrogen chloride used when a formic acid-hydrogen chloride system is being employed will usually be within the range of 1 to 10% based on the weight of the total solvent, and the quantity of sulfuric acid used when a formic acid-sulfuric acid is being employed will in most cases be within the range of 1 to 30% based on the weight of the total solvent. The formic acid and sulfuric acid used in any of the solvent systems of this invention need not be anhydrous i.e. the formic acid may contain up to 10% and preferably contains 2% by weight of water and the sulfuric acid may contain up to 5% by weight of water. It has been found that the use of a solvent containing a small amount of water, e.g. up to 5% by weight, yields particularly stable polymer solutions. However, the total amount of water in the solvent system should not be large enough to seriously impair the ability of the solvent to dissolve the polymer in the desired concentration. In many cases the amount of water present will not be greater than 10% based on the weight of the solvent.

The polymer may also be dissolved in a three component mixture of formic acid, sulfuric acid and hydrogen chloride. In this case, a slurry of the polymer may be prepared in a formic acid-sulfuric acid mixture containing less sulfuric acid than is necessary to dissolve the polymer, and hydrogen chloride bubbled in until the polymer dissolves. In general, the total number of mols of sulfuric acid and hydrogen chloride will be approximately equal to the mols of —CONH— groups in the polymer.

The solution may be prepared within a wide range of temperatures, e.g., 0 to 100° C., although it is convenient in many cases to prepare the solutions at room temperature. The solution may be extruded to form shaped articles at a temperature in the range of 0 to 100° C.

A wide variety of liquids in which the polymer is insoluble may be used as the coagulating bath in the formation of shaped articles from the solutions of this invention, when it is desired to employ wet spinning techniques. These include, for example, water, tetrahydrofuran, acetone, water-formic acid mixtures containing up to about 60% by weight of formic acid, hydrochloric acid containing up to 35% by weight of HCl, and aqueous sulfuric acid containing up to about 50% by weight of sulfuric acid.

In accordance with another aspect of the invention, a spinning solution containing sulfuric acid as a co-solvent with formic acid is initially extruded into an atmosphere wherein most of the formic acid is vaporized to obtain a filament containing residual sulfuric acid. The residual acid may then be extracted from the filament in an aqueous bath. Filaments having particularly desirable properties are obtained when the filament is drawn or stretched to orient the polymer molecules at the same time the acid is being extracted. For this simultaneous extraction and orientation, the bath may be at any temperature, e.g., from room temperature or below to the boiling temperature of the bath. Alternatively, the acid may be extracted in a first aqueous bath without drawing, and the filament oriented by drawing in a second aqueous bath. If this latter procedure is used, the second bath is preferably somewhat above room temperature e.g. from 55° C. up to the boiling temperature of the bath.

The following examples further illustrate the invention.

EXAMPLE I

Polyhexamethylene terephthalamide having an inherent viscosity of 1.10 dl./g. in sulfuric acid and prepared by the interfacial technique from hexamethylene diamine and terephthaloyl chloride using magnesium oxide as an acid binder as described in application Serial No. 6,885, filed February 5, 1960 by Jamison, was dissolved at room temperature in a solvent consisting of 80 parts by weight of formic acid of 98% by weight concentration and 20 parts by weight of sulfuric acid of 97% by weight concentration to yield a solution containing 20% of polymer based on the weight of the solvent. The polymer is negligibly soluble in the 98% formic acid alone. The solution, which had a viscosity of 320 poises at 28° C., was dry spun by forcing it by means of nitrogen at superatmospheric pressure through a 0.100 mm. monofil jet into a 30-inch long cabinet through which air at 120–160° C. was blown co-current with the filament. The filament was drawn in hot water to 100% increase in length to orient the fiber and extract residual sulfuric acid. The resulting filament had a denier of 2.73, a tenacity of 2.80 grams per denier, an elongation of 12.6% and a modulus of 33.4 grams per denier. The filament had some orientation and a low degree of crystallinity and was thus capable of further improvement by hot drawing.

EXAMPLE II

Polyhexamethylene terephthalamide having an inherent viscosity of 1.10 dl./g. measured in sulfuric acid and prepared as in Example I was dissolved in a formic acid-hydrogen chloride solvent system by forming a slurry of polymer in surfuric acid and bubbling in hydrogen chloride at room temperature until the polymer dissolved. The polymer concentration was 25% based on the weight of the solution and the solution absorbed about 1 mol of HCl per mol of —CONH— groups in the polymer. The solution was dry spun into a cabinet kept at 60–106° C. to obtain useful filaments.

The solution was also wet spun into acetone, tetrahydrofuran, water, a mixture of 9 parts water and 1 part formic and a mixture of 26 parts water and 1 part HCl to obtain useful filaments.

The inherent viscosities of the polymers referred to above represent the function $ln\eta_r/C$ at 25° C. and 0.1% polymer concentration of a solution of the polymer in concentrated sulfuric acid, where $\eta_r$ is the relative viscosity of the solution at 25° C., i.e., the ratio of the viscosity of the solution to the viscosity of the solvent acid, and C is the polymer concentration in grams per deciliter of acid. The inherent viscosity is thus expressed as deciliters per gram.

It is to be understood that the foregoing detailed description is given merely by way of illustration and that many variations may be made therein without departing from the spirit of our invention.

Having described our invention what we desire to secure by Letters Patent is:

1. A process comprising forming a solution of polyhexamethylene terephthalamide in which the hexamethylene groups are straight chain, in a solvent consisting essentially of formic acid and a minor amount of hydrogen chloride into filaments, said polyhexamethylene terephthalamide having an inherent viscosity of at least about about one determnied from a solution of 0.1% of polymer in concentrated sulfuric acid at 25° C.

2. A process comprising forming a solution of polyhexamethylene terephthalamide in which the hexamethylene groups are straight chain, in a solvent consisting essentially of formic acid and a minor amount of sulfuric acid into filaments, said polyhexamethylene terephthalamide having an inherent viscosity of at least about one determined from a solution of 0.1% of polymer in concentrated sulfuric acid at 25° C.

3. A process comprising forming a shaped article by extruding through an opening of predetermined shape a solution of polyhexamethylene terephthalamide in which the hexamethylene groups are straight chain, in a solvent consisting essentially of formic acid and a minor amount of a compound selected from the group consisting of sulfuric acid, hydrogen chloride, and mixtures thereof, said polyhexamethylene terephthalamide having an inherent viscosity of at least about one determined from a solution of 0.1% of polymer in concentrated sulfuric acid at 25° C.

4. The process of claim 3 wherein said compound is sulfuric acid used in an amount of 1 to 30% based on the weight of the total solvent.

5. The process of claim 3 wherein said compound is hydrogen chloride used in an amount of 1 to 10% based on the weight of the total solvent.

6. The process of claim 3 wherein said solution contains water in an amount up to 5% based on the weight of the solvent.

7. The process of claim 3 wherein said shaped article is a filament.

8. The process of claim 3 wherein said solution is extruded into a liquid non-solvent for the polymer.

9. The process of claim 3 wherein said solution is extruded into an evaporative atmosphere for the solvent.

10. The process of claim 9 wherein said compound is sulfuric acid and said shaped article is a filament which is drawn in an aqueous bath to simultaneously orient the polymer and remove residual sulfuric acid.

11. The process of claim 9 wherein said compound is sulfuric acid and said shaped article is a filament which is treated without drawing in a first aqueous bath to remove residual sulfuric acid and is then drawn in a second aqueous bath at an elevated temperature to orient the filament.

References Cited by the Examiner

UNITED STATES PATENTS

| | | | |
|---|---|---|---|
| 2,130,948 | 9/1938 | Carothers | 18—54 |
| 2,360,406 | 10/1944 | Dreyfus et al. | 18—54 |
| 2,489,569 | 11/1949 | Foulds et al. | |
| 2,540,855 | 2/1951 | Tullock | 260—31.2 |
| 2,628,886 | 2/1953 | Bamford et al. | 18—54 |
| 2,711,398 | 6/1955 | Barnes et al. | 260—31.2 |
| 2,734,043 | 2/1956 | Crowther | 260—31.2 |
| 3,039,990 | 6/1962 | Huffman | 260—31.2 XR |
| 3,040,033 | 6/1962 | Beaman | 260—239.1 |
| 3,070,562 | 12/1962 | Koller | 260—31.2 |

ALEXANDER H. BRODMERKEL, *Primary Examiner.*

DANIEL ARNOLD, WILLIAM STEPHENSON,
*Examiners.*